(12) United States Patent
Carrara et al.

(10) Patent No.: US 8,763,080 B2
(45) Date of Patent: Jun. 24, 2014

(54) METHOD AND DEVICES FOR MANAGING PERMISSION REQUESTS TO ALLOW ACCESS TO A COMPUTING RESOURCE

(75) Inventors: Michael Anthony Carrara, Ottawa (CA); Daniel Jonas Major, Ottawa (CA); Neil Patrick Adams, Kitchener (CA); Dinah Lea Marie Davis, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 21 days.

(21) Appl. No.: 13/155,116

(22) Filed: Jun. 7, 2011

(65) Prior Publication Data

US 2012/0317638 A1     Dec. 13, 2012

(51) Int. Cl.
*G06F 21/00* (2013.01)

(52) U.S. Cl.
USPC ............................................. 726/2

(58) Field of Classification Search
USPC ............................. 726/1, 2, 4, 17
See application file for complete search history.

(56) References Cited

U.S. PATENT DOCUMENTS

| 7,096,491 B2 | 8/2006 | Cheng |
| 7,174,534 B2 | 2/2007 | Chong et al. |

(Continued)

FOREIGN PATENT DOCUMENTS

| EP | 1465039 A1 | 10/2004 |
| EP | 1564957 B1 | 8/2005 |

(Continued)

OTHER PUBLICATIONS

Extended European Search Report for European Patent Application No. 11169028.5, dated Nov. 15, 2011.

(Continued)

*Primary Examiner* — Ellen Tran
(74) *Attorney, Agent, or Firm* — Bereskin & Parr LLP/S.E.N.C.R.L., s.r.l.

(57) ABSTRACT

Methods and devices for managing permission requests to allow access to a computing resource are disclosed herein. In one example embodiment, the method comprises: for an application to be installed on the computing device, determining an application category that the application is associated with, and retrieving a common permissions list for the application category, wherein the common permissions list identifies at least one computing resource that applications associated with the application category are configured to access; during an installation of the application on the computing device, determining one or more computing resources on the computing device that the application is configured to access when the application is executed on the computing device; determining which computing resources, of the one or more computing resources on the computing device that the application is configured to access when the application is executed on the computing device, are not identified in the common permissions list; and for each computing resource that the application is configured to access when the application is executed on the computing device that is not identified in the common permissions list, providing, in a user interface of the computing device, a permission request to allow the application to access the computing resource.

26 Claims, 8 Drawing Sheets

(56) References Cited

U.S. PATENT DOCUMENTS

| | | |
|---|---|---|
| 7,614,078 B1 | 11/2009 | Stieglitz |
| 7,647,036 B2 | 1/2010 | Omae et al. |
| 8,272,030 B1 | 9/2012 | Annan et al. |
| 8,281,410 B1 | 10/2012 | Sobel et al. |
| 2003/0051169 A1 | 3/2003 | Sprigg et al. |
| 2004/0088563 A1 | 5/2004 | Hogan et al. |
| 2004/0148514 A1 | 7/2004 | Fee et al. |
| 2004/0204073 A1 | 10/2004 | Yanosy |
| 2005/0124332 A1 | 6/2005 | Clark et al. |
| 2005/0210035 A1 | 9/2005 | Kester et al. |
| 2005/0213763 A1 | 9/2005 | Owen et al. |
| 2005/0289348 A1 | 12/2005 | Joy et al. |
| 2006/0026667 A1 | 2/2006 | Bhide et al. |
| 2006/0090192 A1* | 4/2006 | Corby et al. ............ 726/1 |
| 2007/0150617 A1 | 6/2007 | Hariki |
| 2007/0192839 A1 | 8/2007 | Fee et al. |
| 2008/0014912 A1* | 1/2008 | Otaka et al. ............ 455/418 |
| 2008/0052383 A1 | 2/2008 | O'Shaughnessy et al. |
| 2009/0199296 A1 | 8/2009 | Xie et al. |
| 2009/0271844 A1 | 10/2009 | Zhang et al. |
| 2010/0087184 A1 | 4/2010 | Stoev et al. |
| 2010/0242097 A1 | 9/2010 | Hotes et al. |
| 2010/0262619 A1* | 10/2010 | Zargahi et al. ............ 707/770 |
| 2011/0055926 A1 | 3/2011 | Bennett et al. |
| 2011/0307831 A1 | 12/2011 | Cowan et al. |
| 2012/0204235 A1 | 8/2012 | Jaudon et al. |
| 2012/0209923 A1 | 8/2012 | Mathur et al. |
| 2012/0317565 A1 | 12/2012 | Carrara et al. |
| 2012/0317609 A1 | 12/2012 | Carrara et al. |

FOREIGN PATENT DOCUMENTS

| | | | |
|---|---|---|---|
| EP | 2533150 A1 | 12/2012 | |
| EP | 2533168 A1 | 12/2012 | |
| EP | 2533170 A1 | 12/2012 | |
| GB | 2353918 A | 3/2001 | |

OTHER PUBLICATIONS

Co-pending U.S. Appl. No. 13/155,181, "Methods and Devices for Controlling Access to a Computing Resource by Applications Executable on a Computing Device", filed Jun. 7, 2011.
Co-pending U.S. Appl. No. 13/155,217, "Methods and Devices for Controlling Access to Computing Resources", filed Jun. 7, 2011.
Office Action, co-pending U.S. Appl. No. 13/155,181 dated Nov. 15, 2012.
Office Action Response, co-pending U.S. Appl. No. 13/155,181, dated Feb. 14, 2013.
Final Office Action. Co-pending U.S. Appl. No. 13/155,181 Dated May 9, 2013.
Non-Final Office Action. Co-pending U.S. Appl. No. 13/155,217. Dated Apr. 11, 2013.
Response to Extended European Search Report. European Patent Application No. 11169028.5. Dated Mar. 14, 2013.
Response to Office Action. Co-pending U.S. Appl. No. 13/155,217. Dated Jul. 5, 2013.
Response to Final Office Action. Co-pending U.S. Appl. No. 13/155,181. Dated Aug. 7, 2013.
Request for Continued Examination (RCE). Co-pending U.S. Appl. No. 13/155,181. Dated Aug. 7, 2013.
Notice of Allowance. Co-pending U.S. Appl. No. 13/155,217. Dated Aug. 30, 2013.
Examiner Initiated Interview Summary. Co-pending U.S. Appl. No. 13/155,217. Dated Aug. 22, 2013.
Applicant Interview Summary. Co-pending U.S. Appl. No. 13/155,217. Dated Sep. 4, 2013.
Intent to Grant. U.S. Appl. No. 13/155,217. Dated Dec. 11, 2013.
Request for Continued Examination (RCE). U.S. Appl. No. 13/155,217. Dated Dec. 12, 2013.
Petition to Withdraw an Application From Issue After Payment of Issue Fee. U.S. Appl. No. 13/155,217. Dated Dec. 12, 2013.
Decision on Petition. U.S. Appl. No. 13/155,217. Dated Dec. 12, 2013.

* cited by examiner

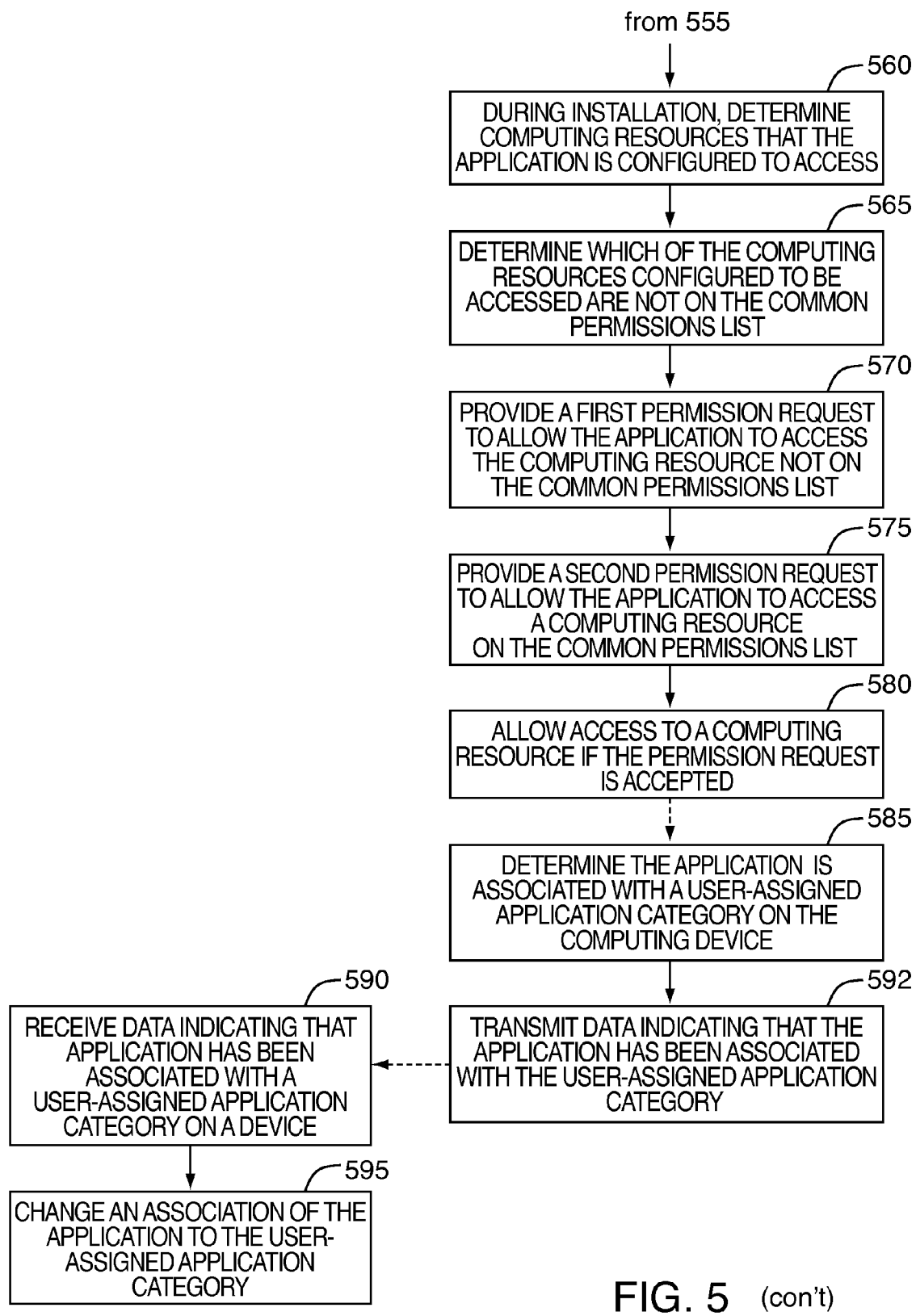

METHOD AND DEVICES FOR MANAGING PERMISSION REQUESTS TO ALLOW ACCESS TO A COMPUTING RESOURCE

FIELD

Embodiments described herein relate generally to controlling access to computing resources by applications executing on a computing device.

BACKGROUND

When executing an application on a computing device, the application may access functionality provided by a computing resource on the computing device. For example, a computing resource may include a camera with which photographic operations may be performed, or a Global Positioning System (GPS) subsystem which may indicate the physical location of the computing device. To prevent unauthorized access to certain computing resources on the computing device by, for example, third-party applications, the device may be configured to request permission to access the computing resources from a user before allowing an application to access the computing resource.

An application developer may disclose the computing resources that the developer's application may access when the application is executed on a computing device, by identifying those computing resources in an installation manifest. This installation manifest can then be provided to computing devices upon which the application is to be installed. The installation manifest may be read when the application is being installed at a given computing device, so that, for each of one or more of the computing resources identified in the installation manifest, a permission request to access the computing resource can be displayed to the user before the application is executed.

An application may request access to numerous computing resources. In turn, this may cause numerous permission requests for access to the computing resources to be displayed to the user. A user may feel frustrated or confused with the many permission requests presented to them.

DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Figure 1:
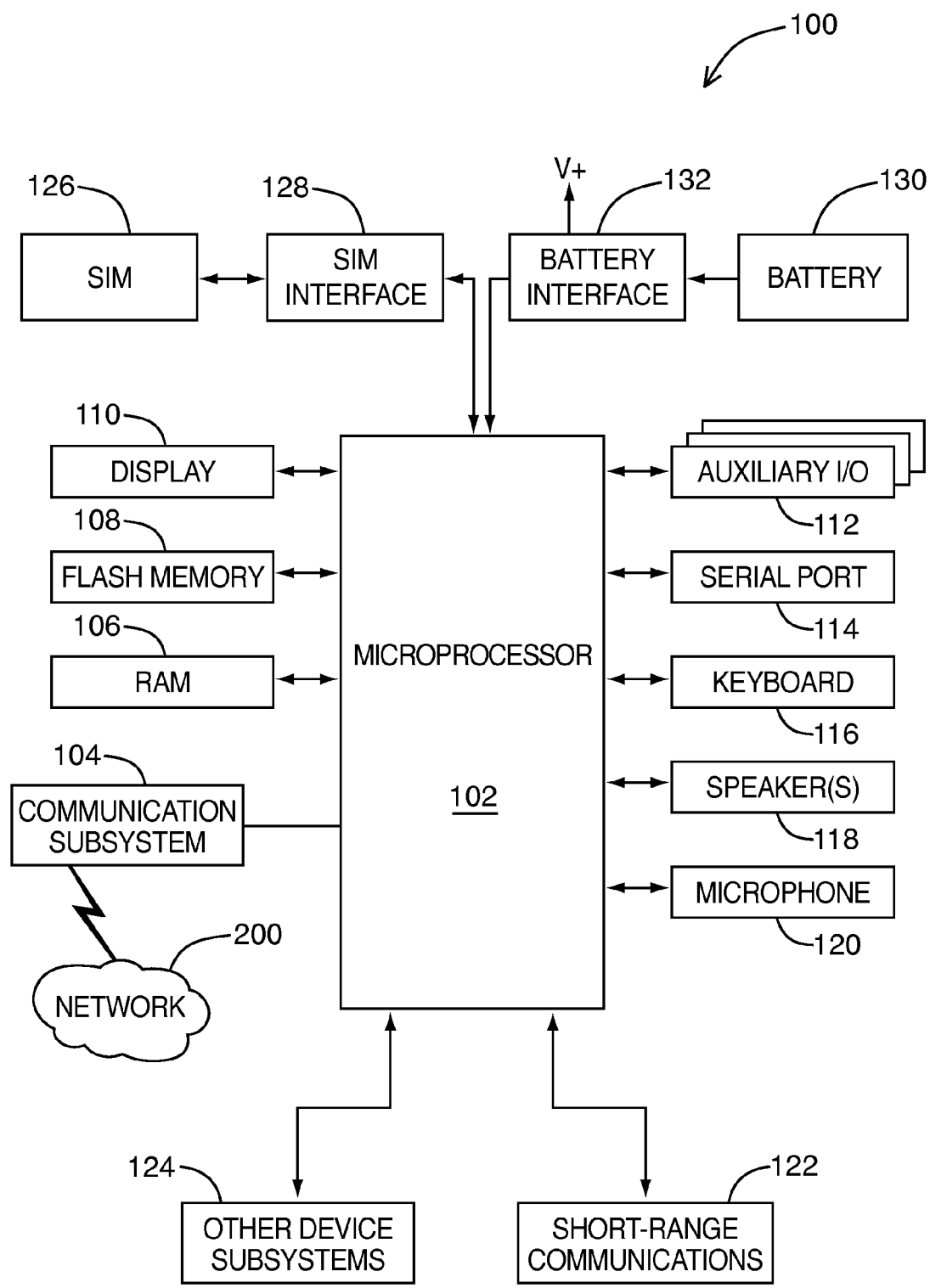
FIG. 1 is a block diagram of a mobile device in one example implementation.

When installing an application that accesses many computing resources, a user may be presented with a large number of permission requests. To process these requests, the user may have to assess the potential security risk involved with permitting the application access to each of the requested resources. The user may, as a result, have to spend time to understand and investigate the type of computing resource that access is being requested for. This may overwhelm and frustrate a user.

In an attempt to quicken the installation process, in some instances, the user may simply choose to allow access to all the requested computing resources. Such a decision may pose security concerns, as some applications might access a computing resource for nefarious purposes.

For at least this reason, it may be desirable to highlight or distinguish permission requests that are atypical in some way (and therefore, may present a higher security risk), so that extra attention can be drawn to these permission requests.

In accordance with at least one embodiment described herein, there are provided methods and devices for identifying computer resources that are commonly accessed for an application category that an application belongs to. When an application then requests access to resources that are not common to the application category, these permission requests may then be flagged for the user so it can be scrutinized by the user with more care.

In one broad aspect, there is provided a method of managing permission requests to allow access to computing resources on a computing device, the method comprising: for an application to be installed on the computing device, determining an application category that the application is associated with, and retrieving a common permissions list for the application category, wherein the common permissions list identifies at least one computing resource that applications associated with the application category are configured to access; during an installation of the application on the computing device, determining, using data from a source other than the common permissions list, one or more computing resources on the computing device that the application is configured to access when the application is executed on the computing device; determining which computing resources, of the one or more computing resources on the computing device that the application is configured to access when the application is executed on the computing device, are not identified in the common permissions list; and for each computing resource that the application is configured to access when the application is executed on the computing device that is not identified in the common permissions list, providing, in a user interface of the computing device, a first permission request to allow the application to access the computing resource.

In some embodiments, the method further comprises: for each computing resource that the application is configured to access when the application is executed on the computing device that is identified in the common permissions list, providing, in the user interface of the computing device, a second permission request to allow the application to access the computing resource; wherein the first permission request is visually distinguishable, when displayed in the user interface of the computing device, from the second permission request.

In some embodiments, the first permission request is displayed more prominently than the second permission request. In some embodiments, at least one of highlighting, warning language, or markings, is applied to the first permission request but not to the second permission request, so that the first permission request is displayed more prominently than the second permission request in the user interface.

In some embodiments, the source other than the common permissions list comprises an installation manifest associated with the application, wherein the installation manifest identifies the one or more computing resources on the computing device that the application is configured to access when the application is executed on the computing device.

In some embodiments, the method further comprises: downloading the installation manifest to the computing device.

In some embodiments, the method further comprises downloading, to the computing device, the application to be installed on the computing device.

In some embodiments, the method further comprises, for each computing resource that the application is configured to access when the application is executed on the computing device that is not identified in the common permissions list, allowing the application to access the computing resource if the first permission request for the computing resource is accepted.

In some embodiments, the determining an application category that the application is associated with comprises receiving a user-assigned application category as input via the user interface of the computing device.

In some embodiments, the method further comprises receiving data from an application server to determine the application category that the application is associated with.

In some embodiments, the common permissions list is retrieved from an application server.

In some embodiments, the application category is used by the application server as a basis for organizing applications available for purchase in an application store, and wherein the application category that the application is associated with is determined based on a categorization of the application in the application store.

In some embodiments, the method further comprises: determining that the application is associated with a user-assigned application category on the computing device; and transmitting data to the application server, wherein the data notifies the application server that the application has been associated with the user-assigned application category on the computing device.

In some embodiments, the common permissions list is retrieved from an enterprise server.

In some embodiments, the common permissions list is provided in a security policy.

In another broad aspect, there is provided a computing device configured to manage permission requests to allow access to computing resources on the computing device, wherein the computing device comprises a processor configured to: for an application to be installed on the computing device, determine an application category that the application is associated with, and retrieve a common permissions list for the application category, wherein the common permissions list identifies at least one computing resource that applications associated with the application category are configured to access; during an installation of the application on the computing device, determine, using data from a source other than the common permissions list, one or more computing resources on the computing device that the application is configured to access when the application is executed on the computing device; determine which computing resources, of the one or more computing resources on the computing device that the application is configured to access when the application is executed on the computing device, are not identified in the common permissions list; and for each computing resource that the application is configured to access when the application is executed on the computing device that is not identified in the common permissions list, provide, in a user interface of the computing device, a first permission request to allow the application to access the computing resource.

In some embodiments, the computing device comprises a mobile device.

In another broad aspect, there is provided a computer-readable medium comprising instructions which, when executed by a processor of a computing device, cause the processor to perform a method of managing permission requests to allow access to computing resources on the computing device, an wherein the method comprises: for an application to be installed on the computing device, determining an application category that the application is associated with, and retrieving a common permissions list for the application category, wherein the common permissions list identifies at least one computing resource that applications associated with the application category are configured to access; during an installation of the application on the computing device, determining, using data from a source other than the common permissions list, one or more computing resources on the computing device that the application is configured to access when the application is executed on the computing device; determining which computing resources, of the one or more computing resources on the computing device that the application is configured to access when the application is executed on the computing device, are not identified in the common permissions list; and for each computing resource that the application is configured to access when the application is executed on the computing device that is not identified in the common permissions list, providing, in a user interface of the computing device, a first permission request to allow the application to access the computing resource.

In another broad aspect, there is provided a method of identifying at least one computing resource that applications associated with an application category are configured to access on a computing device, the method comprising: determining a plurality of applications associated with the application category; for each of the plurality of applications associated with the application category, determining, using data from a source other than a common permissions list for the application category, which computing resources the application is configured to access when the application is executed on the computing device; for each of at least one computing resource, computing how many of the plurality of applications associated with the application category are configured to access the computing resource, and identifying the computing resource in the common permissions list for the application category if the number exceeds a predefined threshold.

In some embodiments, the method is performed at an application server.

In some embodiments, the application category is used by the application server as a basis for organizing applications that are available for purchase in an application store, and wherein for each of the plurality of applications associated with the application category, the application category that the application is associated with is determined based on a categorization of the application in the application store.

In some embodiments, the method further comprises transmitting the common permissions list for the application category to the computing device.

In some embodiments, the method further comprises, for at least one of the plurality of applications, transmitting, to the computing device, data usable by the computing device to determine the application category that the application is associated with.

In some embodiments, for each of the plurality of applications associated with the application category, the source other than the common permissions list comprises an installation manifest associated with the application, wherein the installation manifest identifies the plurality of computing resources on the computing device that the application is configured to access when the application is executed on the computing device.

In some embodiments, the method further comprises: for each of a plurality of computing devices, receiving, from each computing device, data indicating that an identified application of the plurality of applications has been associated with a user-assigned application category on the computing device; and changing an association of the identified application to the user-assigned application category, if data indicating that the identified application of the plurality of applications has been associated with the user-assigned application category is received from at least a predefined number of computing devices.

In another broad aspect, there is provided a computing device configured to identify at least one computing resource that applications associated with an application category are configured to access on a computing device, the computing device comprising a processor configured to: determine a plurality of applications associated with the application category; for each of the plurality of applications associated with the application category, determine, using data from a source other than a common permissions list for the application category, which computing resources the application is configured to access when the application is executed on the computing device; for each of at least one computing resource, compute how many of the plurality of applications associated with the application category are configured to access the computing resource, and identify the computing resource in the common permissions list for the application category if the number exceeds a predefined threshold.

In another broad aspect, there is provided a computer-readable medium comprising instructions which, when executed by a processor of a computing device, cause the processor to perform a method of identifying at least one computing resource that applications associated with an application category are configured to access on a computing device, the method comprising: determining a plurality of applications associated with the application category; for each of the plurality of applications associated with the application category, determining, using data from a source other than a common permissions list for the application category, which computing resources the application is configured to access when the application is executed on the computing device; for each of at least one computing resource, computing how many of the plurality of applications associated with the application category are configured to access the computing resource, and identifying the computing resource in the common permissions list for the application category if the number exceeds a predefined threshold.

Figure 2:
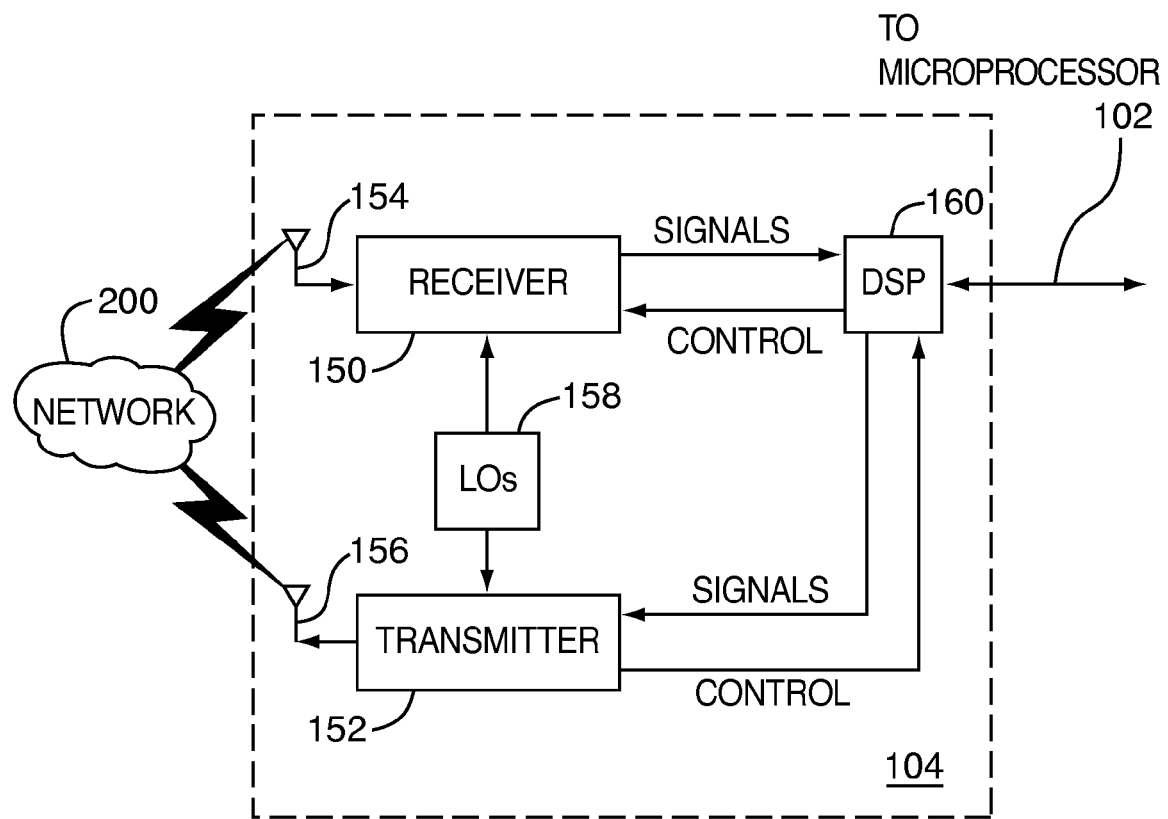
FIG. 2 is a block diagram of a communication sub-system component of the mobile device of FIG. 1.
Figure 3:
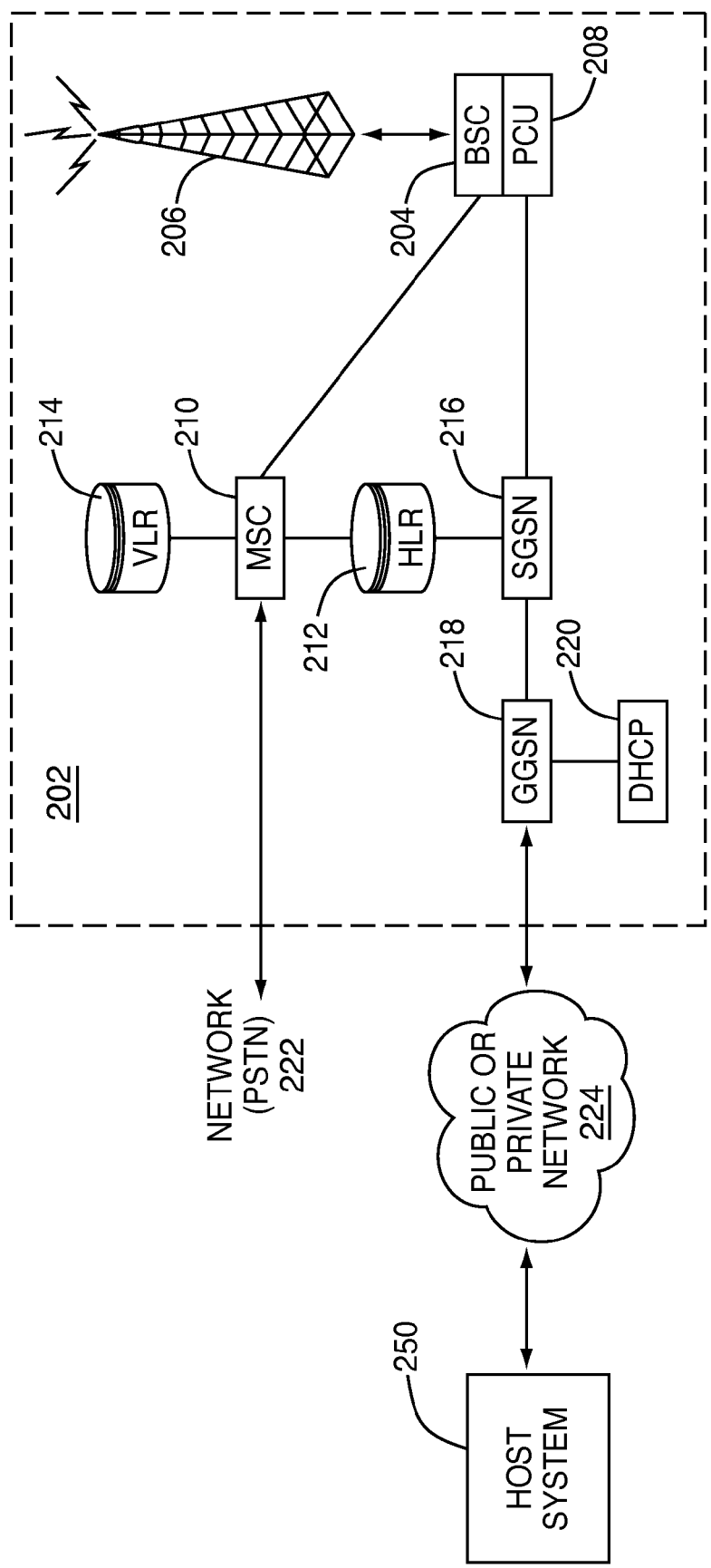
FIG. 3 is a block diagram of a node of a wireless network in one example implementation.

Reference is first made to FIGS. 1 to 3 for a general description of an example structure of a mobile device and how the mobile device operates and communicates with other devices. The mobile device (sometimes referred to alternatively as a "mobile station" or "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader or a data communication device (with or without telephony capabilities). Although a mobile device is described herein by way of illustration, embodiments described herein may be applicable to other computing devices other than mobile devices. For example, embodiments described herein may be applied to other computing platforms that guard resources with permission access requests in variant implementations.

Referring now to FIG. 1 specifically, a block diagram of a mobile device 100 in one example implementation is shown generally. Mobile device 100 comprises a number of components, the controlling component being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 may be configured for cellular communication in accordance with the Global System for Mobile Communication (GSM) and General Packet Radio Services (GPRS) standards. The GSM/GPRS wireless network is used worldwide and it is expected that other standards such as Enhanced Data GSM Environment (EDGE) and Universal Mobile Telecommunications Service (UMTS) may be employed. These standards are mentioned as examples only, and other standards may be employed on computing devices to which embodiments described herein are applied.

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

The wireless network associated with mobile device 100 may comprise a GSM/GPRS wireless network in one example implementation of mobile device 100; however, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSUPA), High-Speed Packet Access (HSPA), and Long Term Evolution (LTE), etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, one or more speakers 118, microphone 120, short-range communication subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications (illustrated as applications 402 in FIG. 4, below), or parts thereof, may be temporarily loaded into a volatile store such as RAM 106.

In some embodiments, mobile device 100 may send and receive communication signals over network 200 after required network registration or activation procedures have been completed. Network access is associated with a subscriber or user of a mobile device 100. To identify a subscriber, mobile device 100 may require a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200.

By inserting SIM 126 into SIM interface 128, a subscriber can access all subscribed services. Services could include: web browsing and messaging such as e-mail, voice mail, Short Message Service (SMS), media transfers (such as music downloading or streaming), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that subscribers are not necessarily bound by any single physical mobile device. SIM 126 may store additional subscriber information for a mobile device as well, including datebook (or calendar) information and recent call information. In certain embodiments SIM 126 may be a different type of user identifier and may be integral to mobile device 100 or not present at all. By way of further examples, a Universal Integrated Circuit Card (UICC), eUICC (Embedded UICC), Removable User Identify Module (R-UIM), CDMA Subscriber Identify Module (CSIM), or Universal Subscriber Identify Module (USIM) may be employed.

Mobile device 100 includes a power pack that supplies power to electronic components and that supports portability. The power pack may be of any type, but for clarity it will be assumed that mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications may also be loaded onto mobile device 100 through network 200, auxiliary I/O subsystem 112, serial port 114, short-range communications subsystem 122, or the other device subsystems 124. This flexibility in application installation increases the functionality of mobile device 100 and may provide enhanced on-device functions, communication-related functions, or both. For example, secure communication applications may enable electronic commerce functions and other such financial transactions to be performed using mobile device 100. Numerous other types of applications may be loaded onto mobile device 100 or other computing devices, including without limitation, messaging applications (e.g. e-mail, text, instant, video, etc.), voice communication applications, calendar applications, address book applications, utility applications, browser application, media player (e.g. audio, video, etc.) applications, social network applications, camera applications, gaming applications, productivity applications, etc.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

It should be noted that the term "download" and forms thereof as used herein, in the specification and in the claims, are used generally to describe a transfer of data from one system to another, and is not intended to be limiting with regards to the origin or destination of the transfer, for example. Accordingly, where the term "download" and forms thereof are used in the specification and in the claims, it is intended to encompass other forms of transfers including, for example, an "upload" or a "sideload" of data (e.g. a Universal Serial Bus (USB) sideload).

Short-range communications subsystem 122 provides for wireless device connections to enable communication between mobile device 100 and different systems or devices, without the use of network 200. For example, subsystem 122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, infrared fingerprint detector, or a roller wheel with a dynamic button pressing capability. Further, auxiliary I/O subsystem 112 may comprise a two-dimensional navigation (or scrolling) component, such as a track ball, a joystick or a directional pad, each optionally with a dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to the one or more speakers 118, and signals for transmission would be generated by microphone 120. Alternative voice or audio I/O subsystems, such as a voice message recording subsystem, may also be implemented on mobile device 100. Although voice or other audio signal output is accomplished primarily through the one or more speakers 118, display 110 may also be used to provide additional information such as the identity of a calling party, duration of a voice call, or other voice call related information. Microphone 120 can receive a supply of power, in the form of a bias voltage and bias current, from the rechargeable battery 130. Different types and configurations of microphone 120 can be incorporated into the mobile device 100.

Referring now to FIG. 2 specifically, a block diagram of the communication subsystem 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3 specifically, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200.

GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server.

Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

The public or private network 224 may also provide access to a host system 250.

Figure 4:
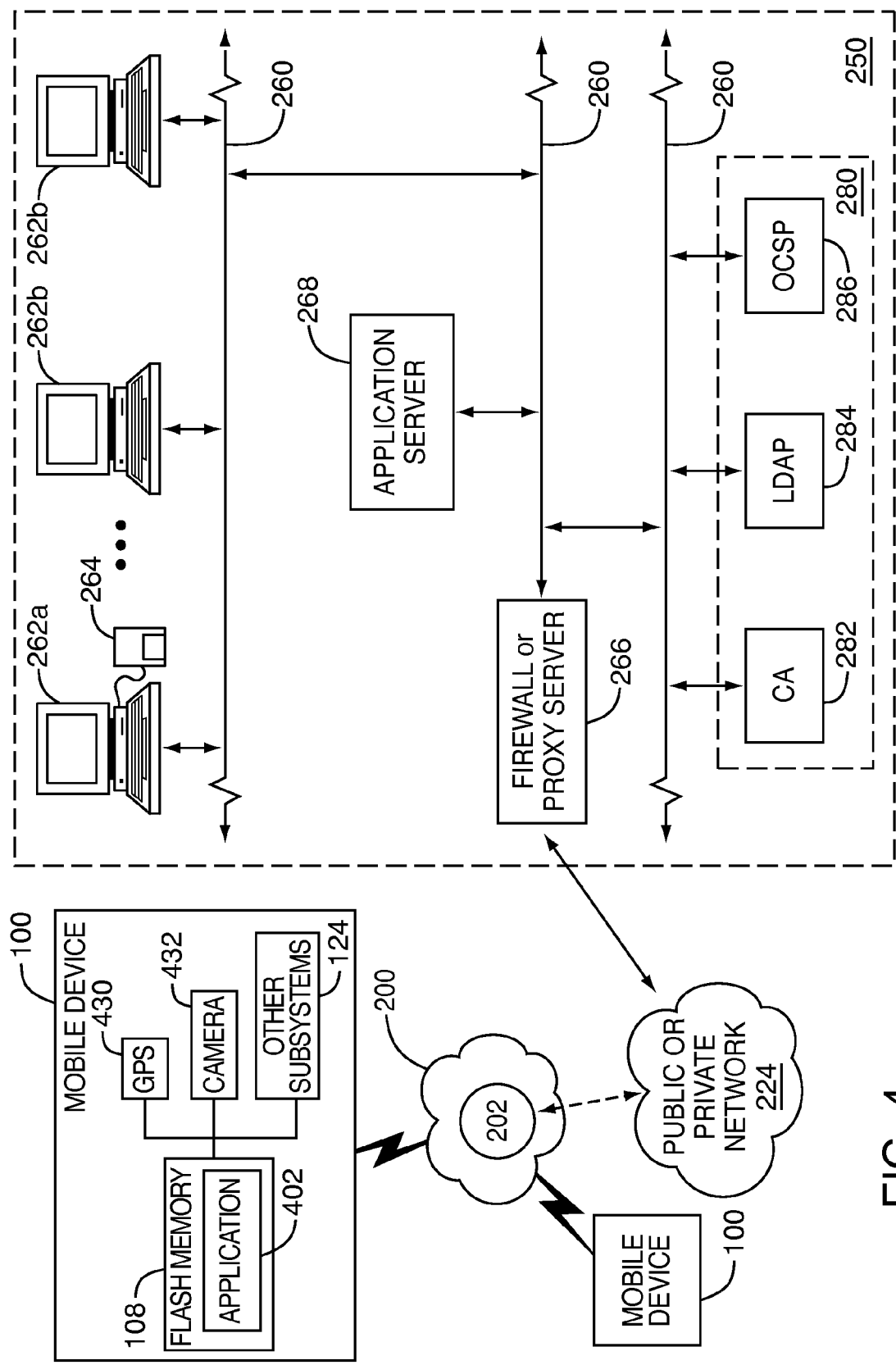
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262*a* with an accompanying cradle 264 for the user's mobile device 100 is situated on LAN 250. Cradle 264 for mobile device 100 may be coupled to computer 262*a* by a serial or a USB connection, for example. Other user computers 262*b* are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262*a* to mobile device 100, and may be particularly useful for bulk information updates often performed in initializing mobile device 100 for use. The information downloaded to mobile device 100 may include certificates used in the exchange of messages. It will be understood by persons skilled in the art that user computers 262*a*, 262*b* will typically be also connected to other peripheral devices not explicitly shown in FIG. 4.

Embodiments described herein relate generally to control of applications (e.g. 402). Accordingly, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Secure communication protocols rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encrypted using the sender's private key, which can then be appended to the outgoing message. To verify the signature of the message when received, the recipient uses the same technique as the sender (e.g. using the same standard hash algorithm) to obtain a digest of the received message. The recipient also uses the sender's public key to decrypt the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

For a public key to be trusted, its issuing organization must be trusted. The relationship between a trusted CA and a user's public key can be represented by a series of related certificates, also referred to as a certificate chain. The certificate chain can be followed to determine the validity of a certificate.

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Applications 402 executable on a mobile device 100 may be stored on an application server 268. Application server 268 may have an application database [not shown] that stores applications 402 for download and execution on the mobile device 100. To have access to the applications 402 stored on the application server 268, each user may have a user account managed by the application server 268. Access to the application server 268 may be provided via a client application operating on mobile device 100, although in variant embodiments, access to the application server may be provided through a web browser, for example.

As illustrated, the application server 268 may comprise an internal network server of the host system 250 used to store applications 402 to be deployed to the organization's mobile devices 100. In a variant embodiment, the application server 268 may additionally or alternatively provide an application store or application market that is accessible from the mobile device 100. The application store may allow users of a mobile device 100 to search for, purchase, and download applications 402 to their mobile device 100. In some embodiments, the application server 268 may reside outside of the host system 250, on a remote system accessible via the public or private network 224, for example.

For ease of understanding the described embodiments related to application control, FIG. 4 further illustrates a simplified view of a subset of components of the mobile device 100 described above. The mobile device 100 may run software applications 402 (sometimes referred to simply as "apps") that access computing resources on the mobile device 100. Applications may be stored in the flash memory 108 of the mobile device 100 or other persistent store, and may access computing resources available on the mobile device 100 when executed. Access may be in the form of the applications invoking application programming interfaces (APIs) made available by the OS to access the computing resources, for example.

Computing resources may be associated with a hardware component (e.g., sensors, radios, or peripherals described above) or software module (e.g., ones that provide access to data or communication buses described above), and may be made accessible to the application 402 via an API provided by the operating system (OS) of the mobile device 100. For example, the mobile device 100 may allow applications to access a GPS subsystem 430 that is capable of determining the physical location of the mobile device 100, or a camera subsystem 432 that is capable of capturing photographs or video. Other accessible resources may include access to software functionality (e.g., encryption services) or data (e.g., phone book entries) available on the mobile device 100, for example.

An installation manifest [not explicitly shown in FIG. 4] that identifies the computing resources that an application 402 may access when the application is executed on mobile device 100, may be associated with the application 402. Accordingly, when a given computing resource is identified in an installation manifest associated with an application, the application is configured to access the computing resource, and the user can expect that computing resource to be accessed by the application, though not necessarily in every single instance when the application executes. Conversely, when the installation manifest associated with the application fails to identify the computing resource as a resource that the application will access on the computing device when the application is executed, then the application is not configured to access the computing resource.

The installation manifest may be uploaded with the application 402 to the application server 268 from a developer device by the application developer. The installation manifest may be stored with the application 402 on the application server 268, and subsequently provided with an application being downloaded to mobile device 100.

A software or application developer creating the application may include the installation manifest in an application manifest that describes the application 402, and may be specifically formatted for the operating system (OS) that the application 402 is intended to be executed on. For example, the application manifest may be a property list (plist) file for the iOS operating system, or an AndroidManifest.xml file in the Android operating system in some implementations. The application manifest may be stored in an XML format.

Figure 5:
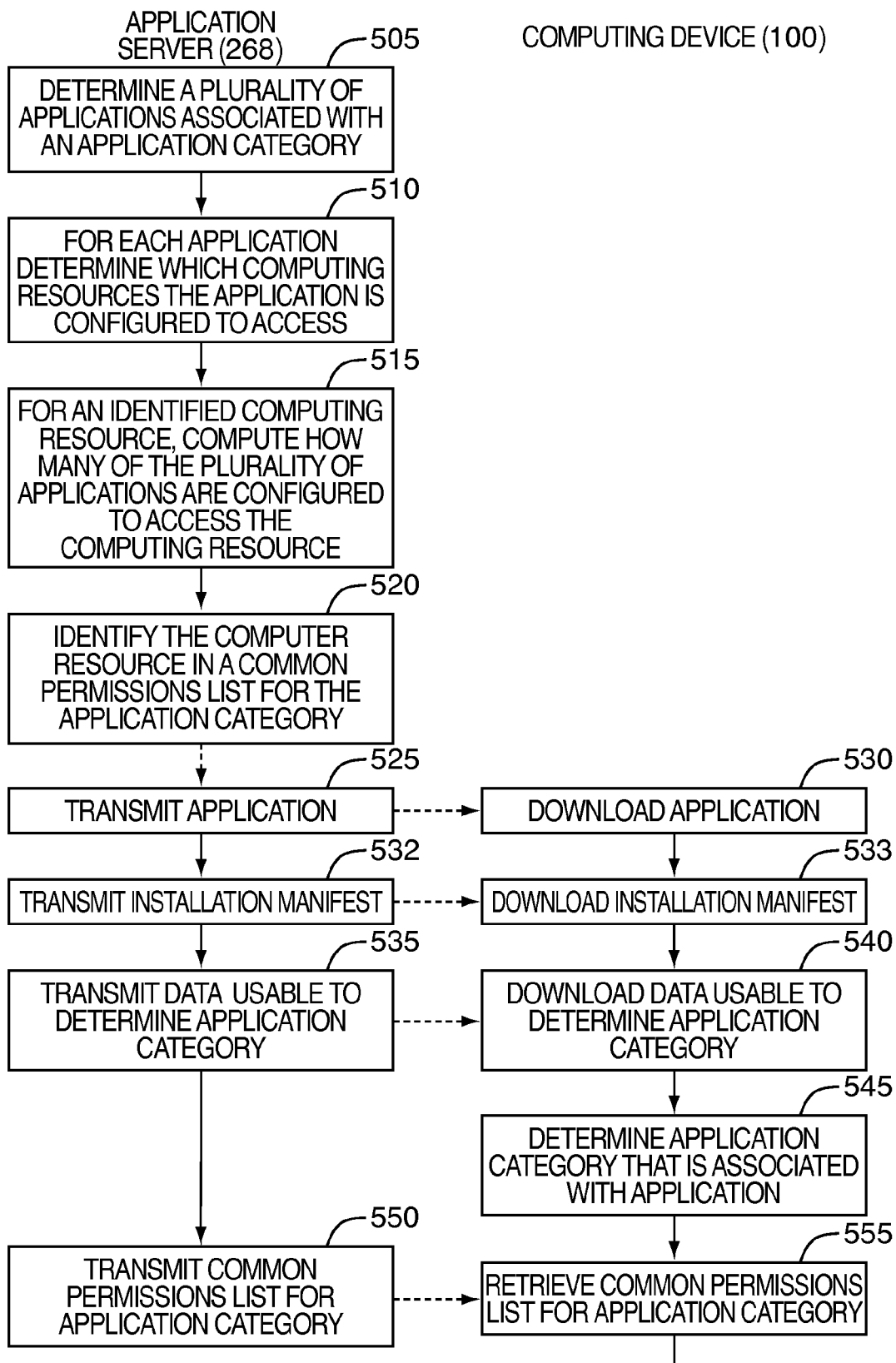
FIG. 5 is a flowchart diagram illustrating the interaction and sequence of events between an application server and a mobile device, in accordance with at least one embodiment.

Referring to FIG. 5, a flowchart diagram illustrating the interaction and sequence of events between an application server and a mobile device, in accordance with at least one embodiment, is shown generally as 500. For convenience, embodiments herein are described in the context of the mobile device 100 shown in FIG. 1.

To more clearly illustrate the acts of FIG. 5, an example scenario of installing an application entitled 'CycleNation' on a mobile device: 'Bob's device' will be discussed. Reference will simultaneously be made to FIGS. 6A and 6B, which show examples of visual output involving this example scenario.

At 505, the application server 268 determines a plurality of applications 402 associated with an application category.

In some embodiments, the applications 402 may be assigned to an application category by a system administrator of the organization. As a part of the system administrator's duties to keep devices and users safe, the administrator may desire to group applications together so as to be able to administer their security privileges together.

Additionally or alternatively, the application category may be used by the application server 268 as a basis for organizing applications 402 that are available for purchase in an application store. In this case, the plurality of applications 402 associated with the application category is determined based on a categorization of the application in the application store. For example, the application store may provide application categories for 'Productivity', 'Games', or 'Leisure', so that users of the mobile device 100 will be able to more easily find applications that perform the functionality that they are seeking.

Accordingly, in at least one embodiment, applications are associated with application categories at 505 in advance of the download of those applications to computing devices (e.g. mobile device 100).

Figure 6A:
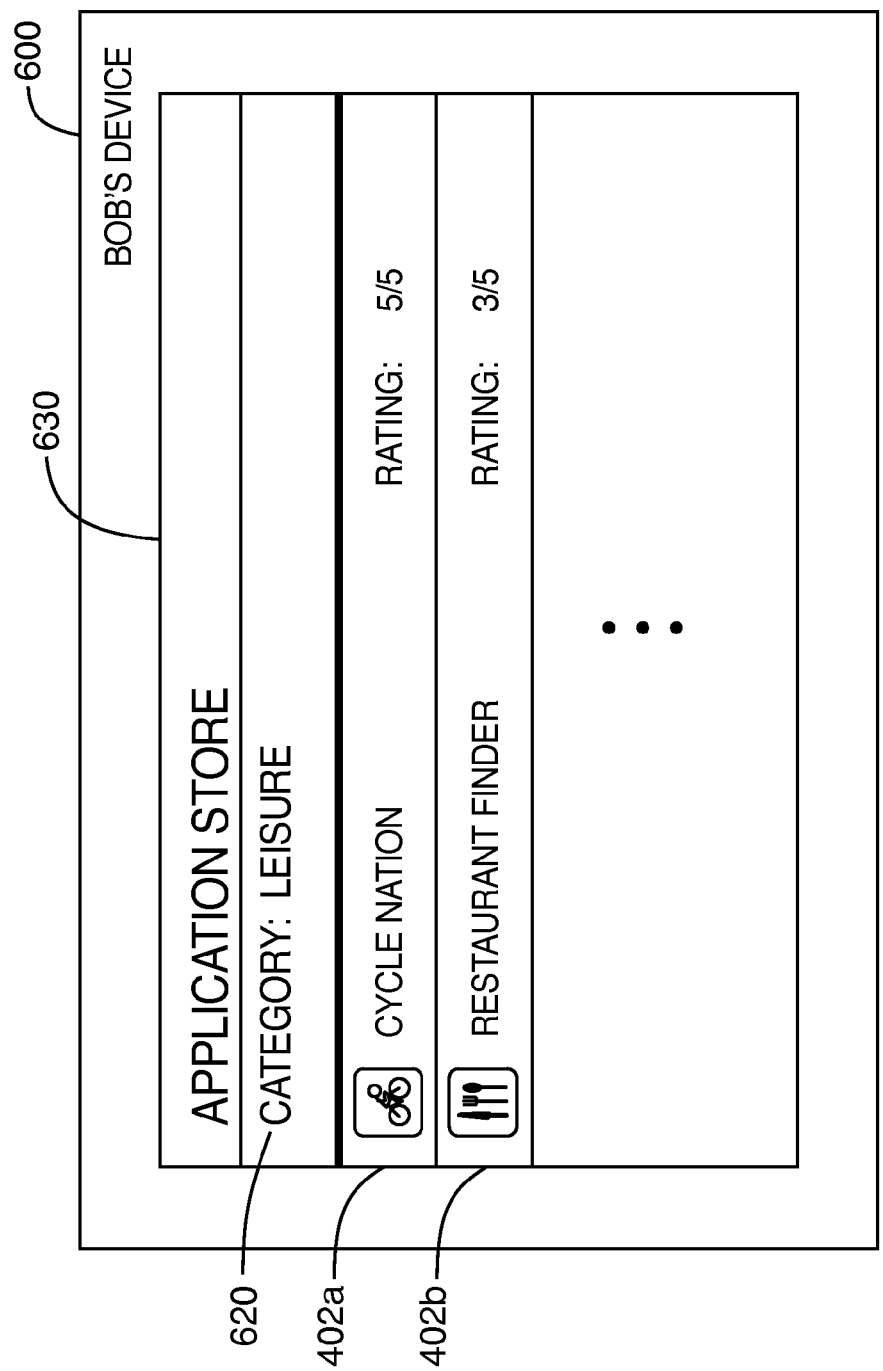
FIG. 6A is an example visual output of a list of applications belonging to an application category that may be available in an application store.

FIG. 6A shows an example visual output of an application store 630, where the user has selected to view applications 402 belonging to the 'Leisure' application category 620. Numerous applications 402 may be associated with an application category, but two applications 402 are shown for the 'Leisure' application category for illustration purposes: a cycling application entitled 'Cycle Nation' 402a, and a restaurant application entitled 'Restaurant Finder' 402b.

Referring again to FIG. 5, at 510, the application server 268 may determine which computing resources each application 402 associated with an application category is configured to access when the application 402 is executed on the mobile device 100. In at least one embodiment, this determination will be performed using data from a source other than the common permissions list for the application category (which, as discussed below, is a list, generated in accordance with at least one embodiment described herein, of computing resources that are commonly accessed for applications associated with the application category).

For example, in some embodiments, the source of data for determining which computing resources each application 402 belonging to the application category is configured to access may be the installation manifest associated with the respective application 402. As noted above, the installation manifest may indicate the computing resources that an application 402 is configured to access when the application 402 is executed, and may be provided by an application developer, when uploading an application 402 to the application server 268, for example.

At 515, for each of at least one computing resource identified as being configured to be accessed by an application belonging to the application category, the application server 268 may compute how many of a plurality of applications 402 associated with the application category are configured to access the computing resource. This may involve the application server 268 maintaining a counter of the number of applications that have indicated (e.g., through their respective installation manifests) that they may access the computing resource during execution.

At 520, the application server 268 may identify computing resources in a "common permissions list" for the application category. The common permissions list is generated (e.g. by the application server 268), after identifying the computing resources that are accessed by multiple applications associated with a particular application category, to indicate those computing resources that are commonly accessed by the applications associated with the application category. In some embodiments, a particular computing resource will only be added to the common permissions list if a minimum number of applications 402 in the application category is determined to be configured to access that computing resource (e.g. based on the installation manifests for those applications 402). A determination may be made to verify that the number of applications 402 in the application category that is determined to be configured to access that computing resource meets or exceeds a predefined threshold. The threshold value may be dynamic—i.e., in addition to setting a threshold that is a static value, the threshold may be based on a minimum percentage or frequency of the applications 402 associated with the application category, in some embodiments.

In the example scenario, the application server 268 may determine that a large number of applications 402 in the 'Leisure' application category 620 access the 'web-browsing' and the 'location-based services' computing resources. This may be the case, for example, because a minimum threshold number of applications in the 'Leisure' category access the website of their application developers, and require the physical location of the mobile device 100. These two resources may then be identified on a common permission list to be generated and associated with the 'Leisure' application category 620, to indicate that these two resources are commonly accessed by applications 402 in that application category.

It should be noted that in some cases (e.g., when the application server 268 provides an application store), the number of applications 402 associated with an application category may not be static. For example, new applications 402 may get uploaded to the application server 268, existing applications 402 may get updated with new functionality that access new computing resources, and/or applications 402 may be re-categorized under a different application category. Therefore, in some embodiments, the acts performed by the application server 268 may periodically be repeated to update the common permission list for an application category, to better ensure that the common permission list is an accurate representation of the common computing resources accessed by applications in an application category at any given time.

In some embodiments, no computing resources may be added to a common permissions list unless there are a sufficient number of applications in the application category (e.g., the total number of applications 402 being considered and are associated with an application category meets or exceeds a pre-defined threshold number).

Once the common permissions list for an application category has been generated, the common permissions list can be transmitted by the application server 268 to the mobile device 100 so that it can be used by the mobile device 100 to identify uncommon or atypical permission requests for applications 402 associated with that application category.

The actions performed at the mobile device 100 in accordance with at least one embodiment, will now be discussed in greater detail.

Referring again to FIG. 5, at 530, the mobile device 100 may download an application 402 from the application server 268, the application 402 being transmitted to the mobile device 100 at 525.

At 533, the mobile device 100 may download the installation manifest associated with application 402 from the application server 268, the installation manifest being transmitted to the mobile device 100 at 532. In some embodiments, the installation manifest and the application 402 may be downloaded together (e.g. in a bundled package). As previously noted, the installation manifest may identify one or more computing resources on the mobile device 100 that the application is configured to access when the application 402 is executed on the mobile device 100.

For example, continuing with the example scenario described earlier, the user 'Bob' viewing the number of applications 402 in the 'Leisure' category (see FIG. 6A) may decide to select the 'Cycle Nation' application for download to his mobile device 100.

At 540, the mobile device 100 may download data from the application server 268 that is used to determine an application category that the application 402 is associated with, the data being transmitted by the application server 268 at 535.

For example, this data may form part of the earlier-described application manifest describing the application 402 that may also be downloaded to the mobile device 100 (act not explicitly shown). An application manifest may indicate the application category for an application 402 to indicate where the application 402 should appear in an application store.

In another embodiment, the data usable by the mobile device 100 to determine the application category of an application 402 may be provided in a security policy provided by an administrator desiring to provide permissions for groups of applications 402.

In another embodiment, a user-assigned application category may be defined at the mobile device 100 by the user, through the user interface. For example, the user-assigned application category may comprise the folder or categorization (e.g., a tab in a home screen providing multiple tabs to categorize applications 402 on a mobile device 100) that a user associates the downloaded application with. The mobile device 100 may then prompt the user when downloading the application 402 to determine how to categorize the downloaded application (e.g., prompting the user with the question, "where would you like to save this application?"). In this embodiment, data need not be received from the application server at 540, or the user may choose to receive a category suggestion based on received data at 540 and then override the category suggestion with a user-assigned application category.

At 545, the mobile device 100 may use the data downloaded at 540, for example, (or alternatively, a user-assigned application category) to determine an application category that the application is associated with.

In the example scenario, an application manifest associated with the 'Cycle Nation' application provides data that indicates that the 'Cycle Nation' application belongs to the 'Leisure' category, and this data is used by the mobile device 100 to determine that the 'Cycle Nation' application is associated with the 'Leisure' category.

At 555, the mobile device 100 retrieves a common permissions list for the application category determined at 540 from the application server 268, the common permissions list being transmitted by the application server 268 to the mobile device 100 at 550. The common permissions list may identify at least one computing resource that applications associated with the determined application category are configured to access. The common permission list may be provided, for example, in a file that is downloaded to the mobile device 100. In another embodiment, data in the common permission list may form part of some other data transmitted from the application server 268 to the mobile device 100. The common permission list may be received at the mobile device 100 with the application downloaded at 530, the installation manifest downloaded at 533, and/or the data downloaded at 540 in some embodiments. The common permission list may be received at the mobile device 100 in advance of the application being downloaded to the mobile device 100 and stored at the mobile device 100 for future use, in variant embodiments.

In the example scenario, the common permissions list for the 'Leisure' category may be transmitted from the application server 268 to 'Bob's device' 600.

In some embodiments, the common permissions list may be retrieved from a different server unrelated to the application server 268. This different server may comprise an enterprise server or a third-party server, for example.

In variant embodiments, the common permissions list may be provided for in a security policy. This may be the case, for example, if the applications 402 associated with the application category are identified by a system administrator.

In variant embodiments, the common permission list may periodically be updated at the application server 268 to reflect a current makeup of the applications 402 associated with the application category. The application server 268 may periodically transmit the updated common permission list to the mobile device 100 (not shown in FIG. 5). This may increase the likelihood that uncommon permission requests for computing resources by applications associated with a given category will be correctly identified at a given time.

At 560, when installing the application 402 at the mobile device 100, the mobile device 100 may determine one or more computing resources on the computing device that the application 402 is configured to access when the application 402 is executed on the computing device. For example, the installation manifest associated with the application 402 may be read to determine what the application developer indicates as a resource that is configured to be accessed by the application. Persons skilled in the art will understand that this act is to be performed using data from a source other than the common permissions list, as the data is used as basis for comparison with data in the common permissions list.

In the example scenario, this may involve the installation manifest being read by 'Bob's device' 600 to determine that the 'Cycle Nation' application is configured to access the 'web-browsing', 'location-based services' and 'audio recorder' computing resources.

At 565, the mobile device 100 may determine which computing resources, of the computing resources on the computing device that the application is configured to access (e.g., computing resources that appear on the installation manifest), are not identified in the common permissions list.

As noted earlier with respect to the example scenario, the common permissions list for the 'Leisure' category identified two computing resources: 'web-browsing' and 'location-based services'. Therefore, at 565, 'Bob's device' 600 may identify the 'audio recorder' computing resource as not being identified on the common permissions list.

At 570, for each computing resource that the application is configured to access that is not identified in the common permissions list (e.g., a computing resource that may be listed in the installation manifest, but is not commonly accessed for applications from that application category), the mobile device 100 may display, in a user interface, a first permission request to allow the application to access the computing resource.

In accordance with at least one embodiment described herein, by identifying computing resources that are configured to be accessed by an application 402 but are not identified on the common permissions list (and thus, are not commonly accessed for applications 402 belonging to the application category for the application 402), the mobile device 100 can determine the computing resources for which permission requests should be highlighted to the user.

Particularly, because applications 402 are typically be grouped into categories according to the functionality they provide (e.g., 'Games', 'News', or 'Productivity' application categories), it may be inferred that applications belonging to the application category may access a similar set of computing resources, such that permission requests for computing resources not in the common set of computing resources should warrant extra attention from the user. For example, it may be common that applications 402 in the 'News' application category access computer resources that access the Internet to retrieve news information, but it would be uncommon if a news application requests access to the audio recorder. The uncommon permission request may thus be drawn to the attention of the user.

At 575, optionally, for each computing resource that the application is configured to access that is identified in the common permissions list (e.g., computing resources that are both listed in the installation manifest and the common permissions list), the mobile device 100 may display, in a user interface, a second permission request to allow the application to access to the computing resource.

Since the first permission requests are for requests to computing resources that are atypical or uncommon for applications in that application category, these requests may be visually distinguishable from any second permission requests when displayed at the mobile device 100, if second permission requests are displayed at 575. For example, the first permission request may be visually distinguished from other permission requests using an asterisk, red or other colored text or highlighting, warning language, or other formatting or markings.

Figure 6B:
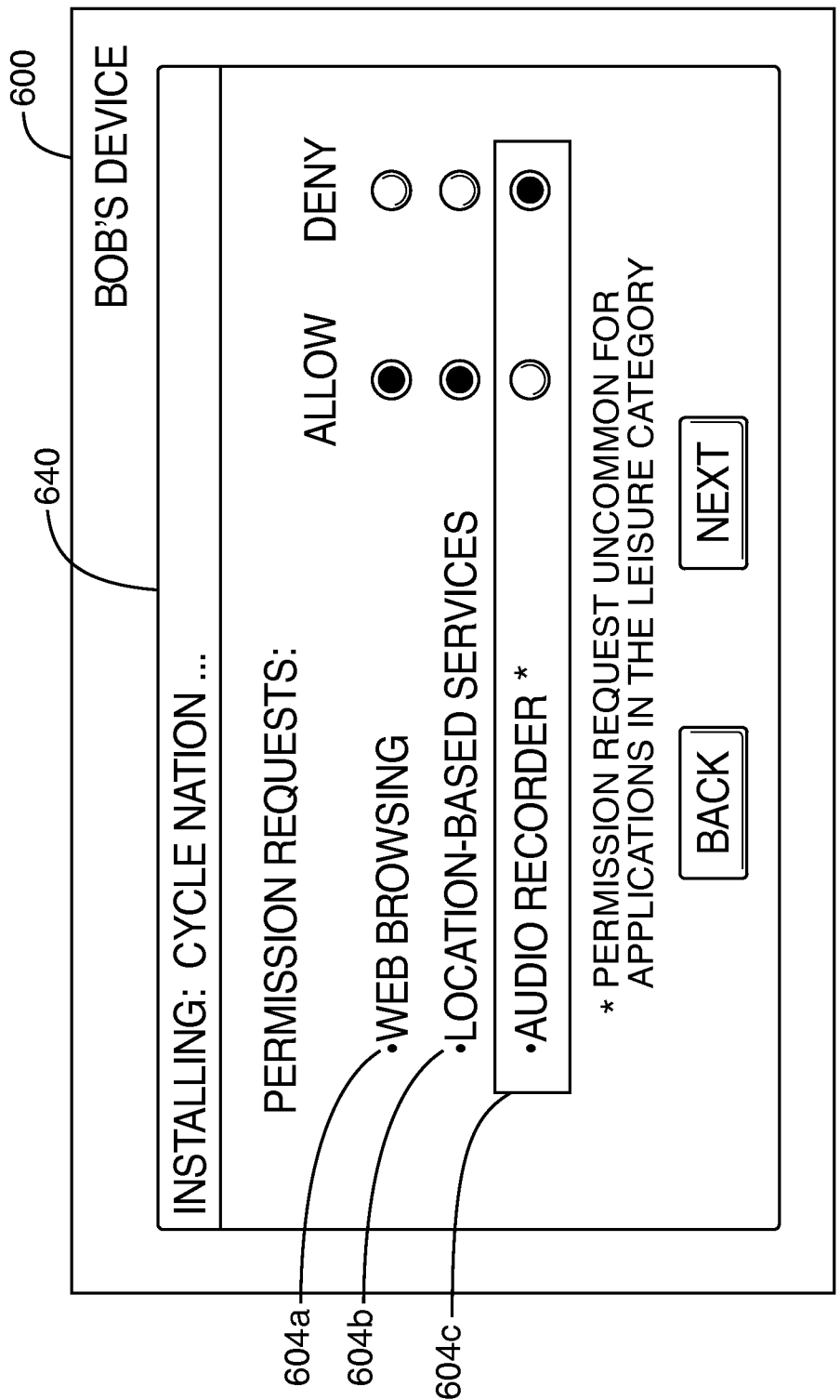
FIG. 6B is an example visual output of permission requests that may be displayed during installation of an application on the mobile device.

Referring to FIG. 6B, a visual output 640 is provided by way of example, illustrating first and second permission requests displayed when installing the application 'Cycle Nation' on 'Bob's device' 600 in the example scenario discussed above. In particular, the 'Cycle Nation' may list the 'web-browsing' 604a, 'location-based services' 604b and 'audio recorder' 604c computing resources as those the application is configured to access when executed (as determined, e.g., by reading the installation manifest for the 'Cycle Nation' application).

Since the 'web-browsing' 604a and location-based services' 604b computing resources are identified on the common permissions list as being common for applications in the 'Leisure' category, the second permission requests for these two computing resources are presented to the user and are not highlighted (i.e., not visually distinguished for the purposes of being drawn to the attention of the user).

The 'audio recorder' computing resource, however, has been determined to be atypical because of its absence from the common permissions list, and as such, is visually distinguished from the other two permission requests. Particularly, a box around the 'audio recorder' 604c permission request, an asterisk, and an accompanying note indicating that the "permission request is uncommon for applications in the leisure category" are shown, in this example. It will be understood that other ways of distinguishing the uncommon permission request from other permission requests are possible in variant implementations.

At 580, for each computing resource that the application 402 is configured to access (e.g., as may be listed in the installation manifest for the application 402) that is not identified in the common permissions list, the mobile device 100 may allow the application 402 to access the computing resource if the first permission request for the computing resource is accepted.

Furthermore, if a second permission request to access a computing resource has been displayed at 575, then the mobile device 100 may allow the application 402 to access the computing resource if the second permission request for the computing resource is accepted.

In the example scenario of FIG. 6B, the mobile device 100 may allow or deny access to each requested resource depending on the input from the user.

In some scenarios (e.g., when the application server 268 is an application store), it may be possible that applications are miscategorized. As a result, the common permissions list associated with the application 402 downloaded to the mobile device 100 may provide an inaccurate list of computing resources that is commonly accessed for that application category. This may cause computing resources to be erroneously flagged when displaying permission requests to the user. Acts 585, 590, 592, and 595 address this situation in one variant embodiment, and are optional.

User of mobile device 100 may have assigned an application category to the application downloaded at 530, either prior to installation (e.g. at 540, 545), during installation, or after installation. For example, this may have been done based on input in a user interface provided during the installation of an application 402. Alternatively, this may be performed implicitly based on a category or folder that the user has associated with the application on their mobile device 100. At 585, the mobile device 100 receives the user-assigned application category as input via the user interface of the computing device, identifying an application category that the application 402 is associated with.

At 592, the mobile device 100 transmits data to the application server 268, to notify the application server 268 that the application 402 has been associated with the user-assigned application category on the computing device. This data is received by the application server 268 at 590.

At 595, the application server 268 may change an association of the identified application 402 to the user-assigned application category. To help ensure that the newly received user-assigned application category is appropriate, the association of the identified application 402 with the application category may only be changed (i.e., the application 402 is re-categorized) at 595, if the data requesting the change is received by the application server 268 from at least a predefined number of computing devices.

In a variant embodiment, the application server 268 may cause the above-described second permission requests for commonly requested computing resources to be displayed at the mobile device 100 before downloading the application. Then, after the application 402 has been downloaded, only the first permission requests may need to be displayed to the user at the mobile device 100. This may speed up the application installation process from the user's perspective.

Some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure makes reference to a number of embodiments. However, it will be understood by persons skilled in the art that other variants and modifications may be made without departing from the scope of the embodiments defined in the claims appended hereto.

The invention claimed is:

1. A method of managing permission requests to allow access to computing resources on a computing device, the method comprising:
    for an application to be installed on the computing device,
        determining an application category that the application is associated with, and
        retrieving a common permissions list for the application category, wherein the common permissions list identifies at least one computing resource that applications associated with the application category are configured to access;
    during an installation of the application on the computing device, determining, using data from a source other than the common permissions list, one or more computing resources on the computing device that the application is configured to access when the application is executed on the computing device;
    determining which computing resources, of the one or more computing resources on the computing device that the application is configured to access when the application is executed on the computing device, are not identified in the common permissions list; and
    for each computing resource that the application is configured to access when the application is executed on the computing device that is not identified in the common permissions list, providing, in a user interface of the computing device, a first permission request to allow the application to access the computing resource; and
    for each computing resource that the application is configured to access when the application is executed on the computing device that is identified in the common permissions list, providing, in the user interface of the computing device, a second permission request to allow the application to access the computing resource;
    wherein the first permission request is visually distinguishable, when displayed in the user interface of the computing device, from the second permission request.

2. The method of claim 1, further displaying the first permission request more prominently than the second permission request.

3. The method of claim 2, wherein at least one of highlighting, warning language, or markings, is applied to the first permission request but not to the second permission request, so that the first permission request is displayed more prominently than the second permission request in the user interface.

4. The method of claim 1, wherein the source other than the common permissions list comprises an installation manifest associated with the application, wherein the installation manifest identifies the one or more computing resources on the computing device that the application is configured to access when the application is executed on the computing device.

5. The method of claim 4, further comprising downloading the installation manifest to the computing device.

6. The method of claim 1, further comprising downloading, to the computing device, the application to be installed on the computing device.

7. The method of claim 1, further comprising, for each computing resource that the application is configured to access when the application is executed on the computing device that is not identified in the common permissions list, allowing the application to access the computing resource if the first permission request for the computing resource is accepted.

8. The method of claim 1, wherein determining an application category that the application is associated with comprises receiving a user-assigned application category as input via the user interface of the computing device.

9. The method of claim 1, further comprising receiving data from an application server to determine the application category that the application is associated with.

10. The method of claim 1, wherein the common permissions list is retrieved from an application server.

11. The method of claim 1, wherein the application category is used by an application server as a basis for organizing applications available for purchase in an application store, and wherein the application category that the application is associated with is determined based on a categorization of the application in the application store.

12. The method of claim 1, further comprising:
    determining that the application is associated with a user-assigned application category on the computing device; and
    transmitting data to an application server, wherein the data notifies the application server that the application has been associated with the user-assigned application category on the computing device.

13. The method of claim 1, wherein the common permissions list is retrieved from an enterprise server.

14. The method of claim 13, wherein the common permissions list is provided in a security policy.

15. A computing device configured to manage permission requests to allow access to computing resources on the computing device, wherein the computing device comprises a processor configured to:

for an application to be installed on the computing device, determine an application category that the application is associated with, and retrieve a common permissions list for the application category, wherein the common permissions list identifies at least one computing resource that applications associated with the application category are configured to access;

during an installation of the application on the computing device, determine, using data from a source other than the common permissions list, one or more computing resources on the computing device that the application is configured to access when the application is executed on the computing device;

determine which computing resources, of the one or more computing resources on the computing device that the application is configured to access when the application is executed on the computing device, are not identified in the common permissions list; and for each computing resource that the application is configured to access when the application is executed on the computing device that is not identified in the common permissions list, provide, in a user interface of the computing device, a first permission request to allow the application to access the computing resource; and for each computing resource that the application is configured to access when the application is executed on the computing device that is identified in the common permissions list provide, in the user interface of the computing device, a second permission request to allow the application to access the computing resource;

wherein the first permission request is visually distinguishable, when displayed in the user interface of the computing device, from the second permission request.

16. The computing device of claim 15, wherein the computing device comprises a mobile device.

17. A non-transitory computer-readable medium comprising instructions which, when executed by a processor of a computing device, cause the processor to perform a method of managing permission requests to allow access to computing resources on the computing device, an wherein the method comprises:

for an application to be installed on the computing device, determining an application category that the application is associated with, and retrieving a common permissions list for the application category, wherein the common permissions list identifies at least one computing resource that applications associated with the application category are configured to access;

during an installation of the application on the computing device, determining, using data from a source other than the common permissions list, one or more computing resources on the computing device that the application is configured to access when the application is executed on the computing device:

determining which computing resources, of the one or more computing resources on the computing device that the application is configured to access when the application is executed on the computing device, are not identified in the common permissions list;

for each computing resource that the application is configured to access when the application is executed on the computing device that is not identified in the common permissions list, providing, in a user interface of the computing device, a first permission request to allow the application to access the computing resource; and for each computing resource that the application is configured to access when the application is executed on the computing device that is identified in the common permissions list providing, in the user interface of the computing device a second permission request to allow the application to access the computing resource;

wherein the first permission request is visually distinguishable, when displayed in the user interface of the computing device, from the second permission request.

18. A method of adding at least one computing resource to a common permissions list the common permissions list for identifying computing resources that applications associated with an application category are configured to access on a computing device, the method comprising:

determining a plurality of applications associated with the application category;

for each of the plurality of applications associated with the application category, determining, using data from a source other than the common permissions list for the application category, which computing resources the application is configured to access when the application is executed on the computing device;

for each of at least one computing resource, computing how many of the plurality of applications associated with the application category are configured to access the computing resource, and if the number of applications that are configured to access the computing resource exceeds a particular threshold, adding the computing resource to the common permissions list for the application category.

19. The method of claim 18, wherein the method is performed at an application server.

20. The method of claim 19, wherein the application category is used by the application server as a basis for organizing applications that are available for purchase in an application store, and wherein for each of the plurality of applications associated with the application category, the application category that the application is associated with is determined based on a categorization of the application in the application store.

21. The method of claim 18, further comprising transmitting the common permissions list for the application category to the computing device.

22. The method of claim 18, further comprising, for at least one of the plurality of applications, transmitting, to the computing device, data usable by the computing device to determine the application category that the application is associated with.

23. The method of claim 18, wherein for each of the plurality of applications associated with the application category, the source other than the common permissions list comprises an installation manifest associated with the application, wherein the installation manifest identifies the plurality of computing resources on the computing device that the application is configured to access when the application is executed on the computing device.

24. The method of claim 18, further comprising:

for each of a plurality of computing devices, receiving, from each computing device, data indicating that an identified application of the plurality of applications has been associated with a user-assigned application category on the computing device; and changing an association of the identified application to the user-assigned application category, if data indicating that the identified application of the plurality of applications has been associated with the user-assigned application category is received from at least a number of computing devices.

25. A server device configured to add at least one computing resource to a common permissions list, the common permissions list for identifying computing resources that applications associated with an application category are configured to access on a computing device, the server device comprising a processor configured to:
- determine a plurality of applications associated with the application category;
- for each of the plurality of applications associated with the application category, determine, using data from a source other than the common permissions list for the application category, which computing resources the application is configured to access when the application is executed on the computing device;
- for each of at least one computing resource,
  - compute how many of the plurality of applications associated with the application category are configured to access the computing resource, and
  - if the number of applications that are configured to access the computing resource exceeds a particular threshold, add the computing resource to the common permissions list for the application category.

26. A non-transitory computer-readable medium comprising instructions which, when executed by a processor of a server device, cause the processor to perform a method of adding at least one computing resource to a common permissions list, the common permissions list for identifying computing resources that applications associated with an application category are configured to access on a computing device, the method comprising:
- determining a plurality of applications associated with the application category;
- for each of the plurality of applications associated with the application category, determining, using data from a source other than the common permissions list for the application category, which computing resources the application is configured to access when the application is executed on the computing device;
- for each of at least one computing resource,
  - computing how many of the plurality of applications associated with the application category are configured to access the computing resource, and
  - if the number of applications that are configured to access the computing resource exceeds a particular threshold, adding the computing resource to the common permissions list for the application category.

* * * * *